UNITED STATES PATENT OFFICE.

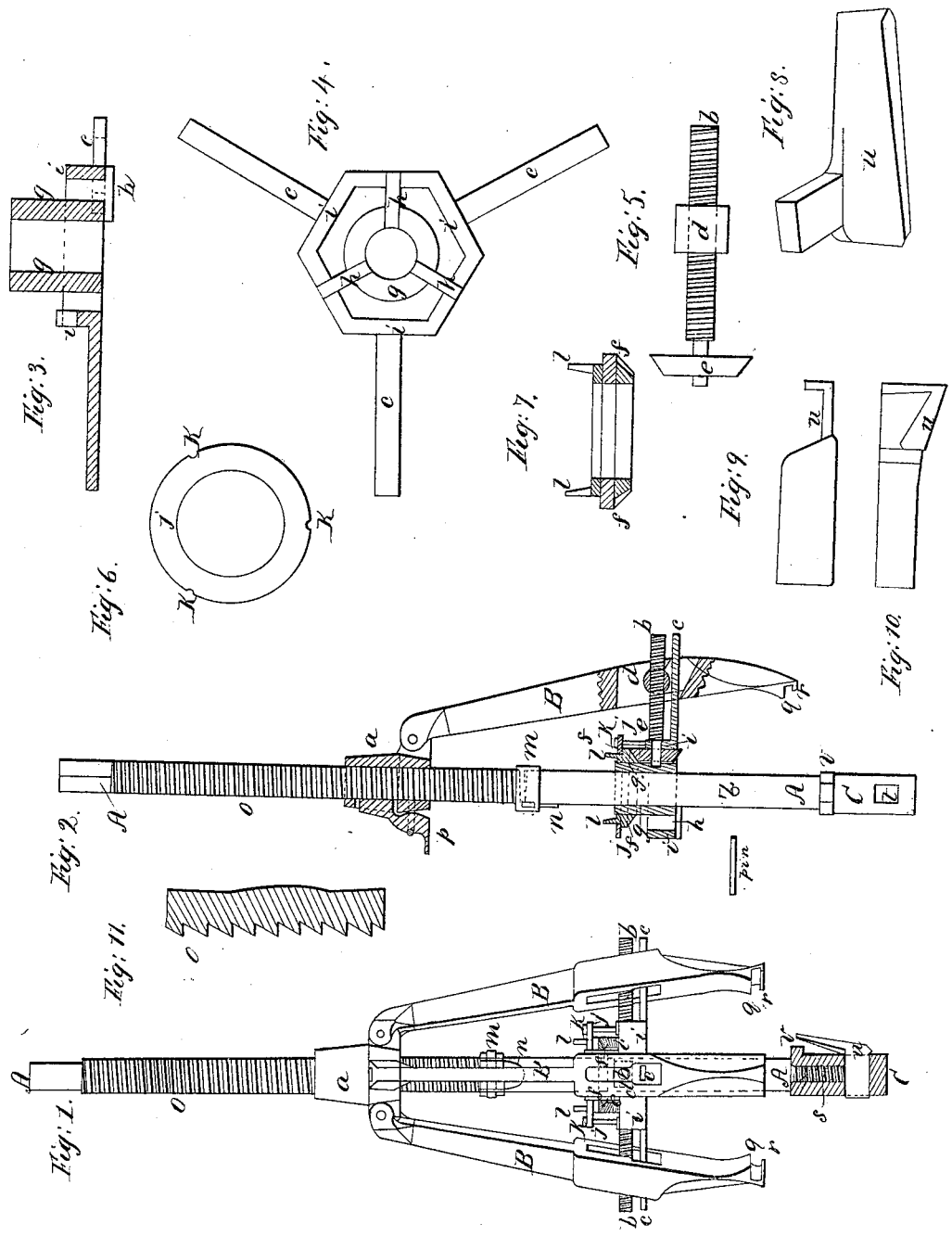

ISAAC MUNDEN, OF ALLEGHENY CITY, PENNSYLVANIA.

MACHINERY FOR PREPARING HUBS FOR BOXES.

Specification of Letters Patent No. 6,941, dated December 11, 1849.

*To all whom it may concern:*

Be it known that I, ISAAC MUNDEN, of Allegheny City, of the county of and State of Pennsylvania, have invented a new and useful machine for boring out the inside of wagon and carriage hubs, or the whole and half box, which I call the " universal boxing-machine;" and I do hereby declare that the following is a clear, full, and exact description of my invention, reference being had therein to the annexed drawings, which form a part of this specification and of which—

Figure 1 is a side view of the machine in a vertical position. Fig. 2 is a section of the same. Fig. 3 is a section of support $h$, and arm $c$, Figs. 1 and 2. Fig. 4 is an underside view of same. Fig. 5 is a top view of one miter wheel $e$, with adjusting screw $b$, and compensating nut $d$, connected. Fig. 6 is a top view of binding plate or ring $j$. Fig. 7 is a section of large miter wheel $f$. Fig. 8 is a view of cutter for making tapering holes. Fig. 9 is a view of cutter for boring square or straight holes. Fig. 10 is a view of the same as Fig. 9. Fig. 11 is an enlarged view of screw or mandrel.

Literal references: A, mandrel; B, clamps; C, cutter holder; $a$, muff with nut in it; $b$ adjusting clamp screws; $c$, arms under screws $b$; $d$, nuts on screws $b$; $e$, small miter wheels; $f$, large miter wheel; $g$, muff supporting same; $h$, stays or cross-piece; $i$, support (hexagonal); $j$, circular plate or ring; $k$, set or adjusting screws in $j$; $l$, ears on wheel $f$; $m$, center or gage muff; $n$, ear on same; $o$, screw on mandrel; $p$, segmental nut in $a$; $q$, shoulders on clamps; $r$, teeth on same; $s$, screw-pin on mandrel; $t$, eye in cutter-holder; $u$, cutting tools; $v$, projection on cutter-holder; $z$, hole for pin in mandrel.

Similar letters indicate the same parts.

The nature of my invention consists of a combination of adjusting clamps or jaws with a mandrel, for the purpose of centering the mandrel perfectly and holding a carriage or wagon hub firmly while being bored; the application to the mandrel of a screw with a thread of the square and V form working in a segmental hinge nut, for the purpose of preventing the mandrel from going downward too fast while boring, and yet, at the same time, allowing the operator to raise and lower it at pleasure; a peculiar mode of forming the cutting-tool for boring, and of fastening it to the mandrel to keep it tight; and also an arrangement for screwing and unscrewing the cutting-tool without using a wrench, which several parts, together with other subordinate and operating parts connected therewith, constitute a boxing machine for boring out the inside of wagon and carriage hubs with great dispatch, precision, and regularity.

To enable others skilled in the art to understand and use my invention, I will now proceed to describe its construction and operation:

In Fig. 1, A, is a mandrel; B, B, B, are three legs, jaws or clamps, which are placed equidistant about the mandrel; they are fastened at one end by joints to a sliding muff or cylinder, $a$, which slides back and forth on the mandrel; and they are supported, held in place and regulated by three adjusting screws $b$, $b$, $b$, and bars or arms $c$, $c$, $c$, lying immediately under the said screws, extending outward from the mandrel and passing througs the jaws or clamps B, B, B, near their middle. The adjusting screws work in compensating or self-adjusting cylindrical nuts $d$, $d$, $d$, which are inclosed in suitable boxes formed in the jaws; end, side, and top views of these nuts are shown in Figs. 1, 2 and 5. The adjusting screws $b$, $b$, $b$, are headed in three small miter wheels $e$, $e$, $e$, which face inward upon the mandrel and gear into one larger wheel $f$, that is fixed on a sliding muff or cylinder $g$, which also moves back and forth upon the mandrel. The sliding muff $g$, forms a part of and is connected with a hexagonal support $i$, by three stays or cross-pieces $h$, $h$, $h$; which support incloses the sliding muff $g$, and bears and holds in place the adjusting screws $b$, $b$, $b$, and the miter wheels $e$, $e$, $e$; and from which also extend the arms $c$, $c$, $c$.

By Fig. 4, is represented an underside view of the support $i$, and its connected parts, the sliding muff $g$, and the arms $c$, $c$, $c$; and by Fig. 3, is represented a vertical section of the same.

The large miter wheel $f$, is boxed in upon the cylinder or muff $g$, and the small wheels $e$, $e$, $e$, that gear into it, with a flat circular plate or ring $j$, which is fastened to the support $i$, by means of small adjusting screws $k$, $k$, $k$. A top view of the ring or plate $j$, is shown in Fig. 6. Projecting upward from the miter wheel $f$, on opposite sides of the mandrel, are two ears $l$, $l$, which are shown in Figs. 1, 2 and 7, the use of which is to lock into a pin that is put through the hole $z$, in the mandrel, when the jaws B, B, B, are to be closed or unclosed. The pin being passed through the hole $x$, when it is above the muff $g$, it is brought up against the ears $l$, $l$, and the mandrel being then turned, motion is given to the wheel $f$, which meshes into the small wheels $e$, $e$, $e$, and thus turning the adjusting screws $b$, $b$, $b$, open and close the jaws B, B, B, simultaneously and equally.

Between the cylinders or sliding muffs $a$, and $g$, is placed another muff or cylinder $m$, which may also be moved back and forth on the mandrel or may be keyed up to one place; and on this muff, extending toward the muff $g$, and lying close against the mandrel is also an ear $n$, which is a little longer than the ears $l$, $l$, so that when the muff $m$, is moved up to the muff $g$, the ears on both muffs will pass each other without locking, the ear $n$, coming inside of the ears $l$, $l$, and between them and the mandrel, and its end in contact with the top of the muff $g$. The object of this arrangement is, that the muff $m$, shall act as a set or gage for governing the mandrel and determining its penetration in boring a hub; it is keyed up at any point on the mandrel according to the depth of the bore, and when the mandrel has penetrated into the hub the proper distance, the ear $n$, comes up against the top of the muff $g$, which prevents it (the mandrel) from going farther.

Upon the upper part of the mandrel is cut a screw $o$, the thread of the square and V in its form, like an ordinary saw-tooth, the square side facing downward or toward the boring end of the mandrel. Seated in the muff $a$, is a segmental flap or hinge nut $p$, which fits upon the screw $o$, the thread of which is shown, enlarged, in Fig. 11.

The function of the nut $p$, is very important and requires special observation. When the nut is in its place and fits close down upon the screw $o$, it prevents the mandrel from going downward or penetrating the hub faster than the turning of the thread, while boring, the square sides of the thread taking hold together and binding against each other; and, at the same time, the nut offers no resistance to the mandrel in going an opposite or upward direction, for the reason that the upper side of the thread being of the V form, or an inclined plane, both on the nut and the mandrel, it slips or rises on its hinge and allows the mandrel to pass without difficulty. The obvious advantage of this arrangement is that while the nut regulates the boring and prevents the mandrel from going down and penetrating the hub too rapidly, it also allows it to slip backward in boring very hard wood or when the cutting-tool comes in contact with a knot or other obstruction, requiring a slower movement to penetrate it; whereas if the mandrel were forced down or forward by a common screw and fixed nut, it would be liable to be sprung or broken by the resistance. Another advantageous property of the segmental hinge nut $p$, is that it may be raised from the screw $o$, giving free passage up or down through the muff $g$, at the will of the operator.

At the lower ends of the jaws or clamps B, are square shoulders $q$, and grips or teeth $r$, for the purpose of holding firmly the hubs while being bored, the shoulders resting upon the end of the hub and the teeth biting into the side when the clamps are screwed up.

Upon the lower end of the mandrel is a screw-pin $s$, of about half its diameter, upon which is fitted a cap or cutter-holder C, in which is a corresponding female screw. The construction of this cap and the plan of securing the cutting-tool in it are novel and simple. Near the head of the cap or cutter-holder is a rectangular eye $t$, which passes through it and opens into the aperture for receiving the screw-pin $s$; and this eye is designed to receive the shank of the cutting-tool $u$, two forms of which, one for boring a tapering and the other a straight hole, are exhibited in Figs. 8 and 9 and 12.

When the cutting-tool is introduced into the eye $t$, and the cap or holders, C, is screwed on to the screw pin $s$, the point of the screw-pin comes against the shank of the cutting-tool and secures it firmly in its place.

On the upper end of the cap C, is a square projection $v$, the object of which is to lock into one of the cross-pieces $i$, for the purpose of screwing the cap on tight and thus fastening the cutting-tool in it, in the manner just described, and for unscrewing the same, the mandrel being turned one way or the other for the purpose; which arrangement does away entirely with the use of a wrench for screwing the cutter-holder off and on, and performs the operation readily and easily.

The mandrel may be turned with the ordinary cross-handle or a crank fixed on its upper end.

Having described the construction and arrangement of my boxing machine, I will now explain the manner of using it. The cutting-tool being placed in the cap C, and properly secured, in the manner just described, I place the hub to be bored between the clamps B, the end resting against the shoulder $q$, and the side against the teeth $r$; the pin is then put in the hole $z$, and locked in the ears $l$, $l$, when, by turning the mandrel, the jaws or clamps are drawn up by means of the screws $b$, $b$, $b$, until the teeth $r$, grip firmly into the side of the hub and hold it stationary. The pin is then taken out of the hole $z$, and the center or gage muff $m$, is keyed up tight upon the mandrel at the proper point or distance from the muff $g$, for boring the requisite depth into the hub; and this being done the work can be proceeded with.

Having thus fully described my invention, what I claim and desire to secure by Letters Patent is—

1. I claim the hinged saws B, B, B, constructed and arranged in the manner described and operated as set forth, for centering the mandrel A, to bore wagon or carriage hubs.

2. I claim the hinged segmental nut $p$, constructed as described, in combination with the mandrel A, which has a square and inclined thread, $o$, cut upon it, as represented in Fig. 11, to coincide with a thread of the same form cut on the inside of the said nut, to prevent the mandrel from feeding down too fast in the act of boring, and also to allow the mandrel to be moved up or down at pleasure, in the manner substantially as herein described.

3. I claim the mode of fastening the cutter $u$, to the mandrel A, by passing it through the slot or eye $t$, of the nut or cutter-box C, formed with an interior thread to fit on to the screw-pin $s$, of the mandrel, whereby by screwing on the nut C, the end of the mandrel is made to retain the cutter $u$, firmly in its proper position for boring. In connection with this arrangement for setting and securing the cutting-tool, I claim the cutter-box formed with the projection $v$, whereby by raising it (the box) until it comes in contact with the shoulder formed by the braces $h$, the cutter can be screwed and unscrewed without a wrench, as herein fully set forth.

ISAAC MUNDEN.

Witnesses:
S. FORGEY,
JAMES MUNDEN.